United States Patent
Fell

Patent Number: 5,915,276
Date of Patent: Jun. 22, 1999

[54] RATE SENSOR

[75] Inventor: Christopher Paul Fell, Plymouth, United Kingdom

[73] Assignee: British Aerospace Public Limited Company, United Kingdom

[21] Appl. No.: 08/946,830

[22] Filed: Oct. 8, 1997

[30] Foreign Application Priority Data

Oct. 8, 1996 [GB] United Kingdom ............ 96209820

[51] Int. Cl.⁶ ........................................... G01P 9/04
[52] U.S. Cl. ............................... 73/504.13; 73/504.02
[58] Field of Search .................. 73/504.13, 504.04, 73/504.03, 504.12, 504.14, 504.15, 504.16, 1.77, 510, 511, 504.02

[56] References Cited

U.S. PATENT DOCUMENTS

| | | | |
|---|---|---|---|
| 5,226,321 | 7/1993 | Varnham et al. | 73/504.13 |
| 5,471,875 | 12/1995 | Sato et al. | 73/504.13 |
| 5,540,094 | 7/1996 | Varnham et al. | 73/504.13 |
| 5,587,529 | 12/1996 | Iguchi et al. | 73/504.13 |
| 5,621,171 | 4/1997 | Fell | 73/504.13 |

FOREIGN PATENT DOCUMENTS

| | | |
|---|---|---|
| 0 461 761 | 12/1991 | European Pat. Off. . |
| 0 581 407 | 2/1994 | European Pat. Off. . |

*Primary Examiner*—Hezron Williams
*Assistant Examiner*—Helen C. Kwok
*Attorney, Agent, or Firm*—Kenyon & Kenyon

[57] ABSTRACT

A rate sensor for sensing applied rate on at least two axes is provided. A vibrating structure is vibrated in a Cos 2θ carrier mode at a Cos 2θ carrier mode frequency such that rotation about one or the other of the two axes will generate a Coriolis force sufficient to cause a rocking motion and rocking mode vibration of the vibrating structure about the same axis out of the plane of the vibrating structure at the Cos 2θ carrier mode frequency. The vibrating structure has a substantially planar, substantially ring or hoop-like form that is shaped and dimensioned to match the frequencies of the Cos 2θ carrier mode and the rocking mode vibration in the vibrating structure to give a resonant amplification of the rocking motion. The rocking mode vibration is proportional to the applied rate. The rocking mode vibration is detected to determine the applied rate.

18 Claims, 10 Drawing Sheets

RATE SENSOR

FIELD OF THE INVENTION

This invention relates to a rate sensor for sensing applied rate on at least two axes and which is preferably, but not exclusively, suitable for sensing rate on three axes.

BACKGROUND OF THE RELATED ART

Rate sensors such as vibrating structure gyroscopes are known which have been constructed using a variety of different structures. These include beams, tuning forks, cylinders, hemispherical shells and rings. A common feature in all of these designs is that they maintain a resonant carrier mode oscillation. This provides the linear momentum which produces a Coriolis force when the gyro is rotated around the appropriate axis.

Figure 1:
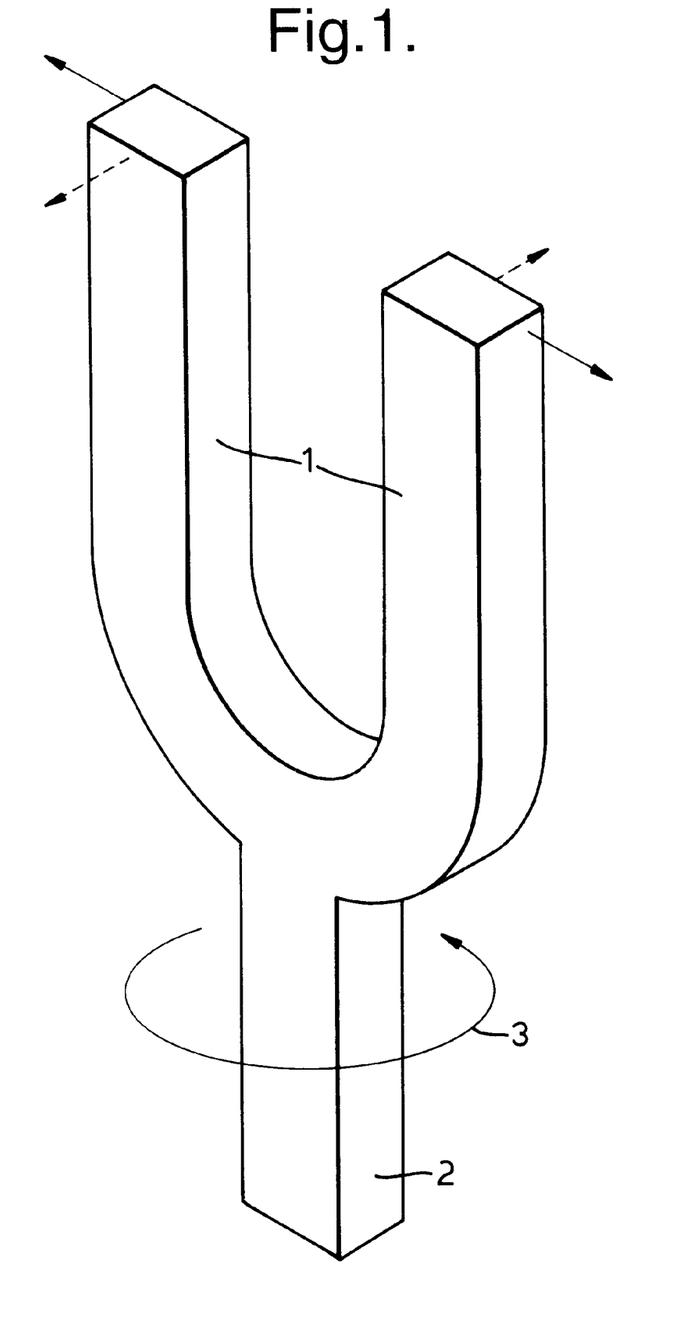
FIG. 1 is a schematic view of a conventional balanced tuning fork vibrating structure not according to the present invention.

A known balanced tuning fork configuration, as shown in the schematic form in the accompanying FIG. 1, is perhaps the most common structural type. For this mechanisation the fork tines 1 are set into motion 180° out of phase, in the plane of the fork structure. The drive is tuned to the resonant frequency of the mode to maximise the amplitude of motion for any given drive level. Accurate information about the material mechanical properties and control of the dimensional tolerances is necessary to balance the frequencies of the tines 1. This ensures that there is no net force or torque around the centre of mass and reduces sensitivity to linear accelerations. An angular rate, $\omega$, applied around the axis of a stem 2 at the fork will generate Coriolis forces in the axis orthogonal to the carrier vibration and rotation axes. The tines of the fork will exhibit an anti-phase vibration, as shown in FIG. 1, at the carrier mode frequency. The amplitude of this vibration will be proportional to the applied rotation rate 3.

It has been proposed to enhance the sensitivity of these devices by matching the resonant frequencies of the carrier and response modes. With these frequencies accurately matched the amplitude of the response mode vibration is amplified by the mechanical quality factor, Q, of the structure. This inevitably makes the construction tolerances more stringent. In practice, it may be necessary to fine tune the balance of the vibrating structure or resonator by adding or removing material at appropriate points. This adjusts the stiffness or mass parameters for the modes and thus differentially shifts the mode frequencies. Where these frequencies are not matched the Q amplification does not occur and the pick-offs must be made sufficiently sensitive to provide adequate gyro performance.

Figure 2A:
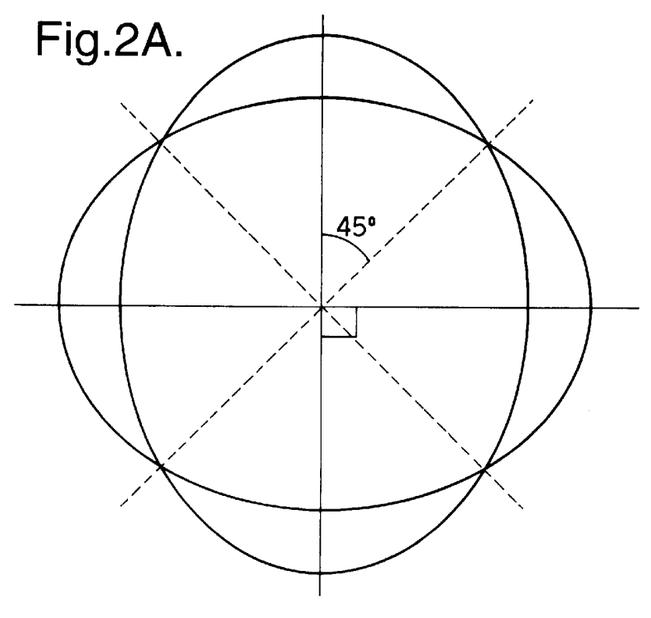
FIG. 2A shows diagrammatically a degenerate Cos 2θ mode vibration in a symmetric resonator or vibrating structure acting as a carrier mode in a conventional manner.
Figure 2B:
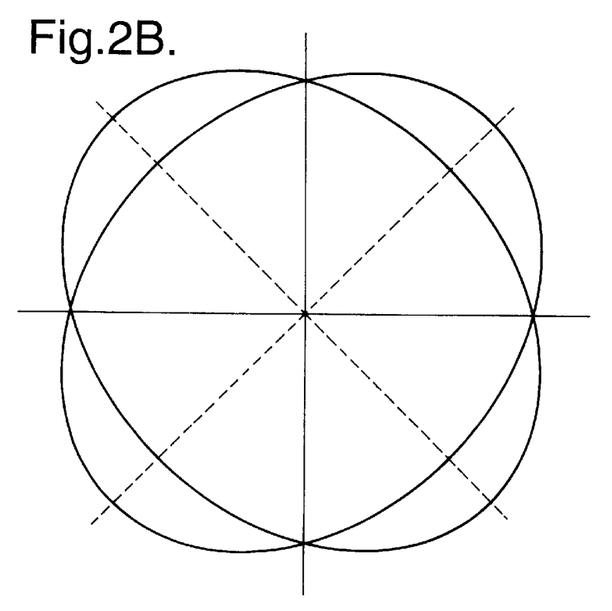
FIG. 2B is a diagrammatic illustration of the other degenerate Cos 2θ mode at 45° to that of FIG. 2A but acting as a response mode.

Known vibrating structure gyros based on rings, cylinders or hemispherical shells generally all use a Cos 2θ vibration mode. For a perfectly symmetric resonator in the form of a ring two degenerate Cos 2θ modes will exist at a mutual angle of 45°. These are shown schematically in the accompanying FIGS. 2A and 2B. One of these modes is excited as the carrier mode as shown in FIG. 2A. For this mechanisation all of the vibration occurs in the plane of the ring. When the structure is rotated about the axis normal to the plane of the ring (z-axis) Coriolis forces couple energy into the response mode as shown in FIG. 2B. This can be understood with reference to FIG. 3. The resonator structure is actually in motion both radially and tangentially. Usually, only radial motion is detected and thus only this motion is considered in FIG. 3 which shows the Coriolis forces acting on a substantially ring-shaped vibrating structure at the anti-nodal points of a Cos 2θ carrier mode vibration when a rate is applied around the axis normal to the plane of the ring. The velocity vectors (v) at the points of maximum radial motion are marked. The diagram shows the extremes of deformation of the resonator vibrating structure 4 from its rest position (5) during the course of a vibration cycle. With no applied rate there will be no response mode motion. When the device is rotated about the z-axis the points of maximum radial motion experience Coriolis forces ($F_c$) as shown. The combination of these forces around the ring sets the degenerate Cos 2θ response mode into oscillation. The resulting amplitude of motion is proportional to the rotation rate.

As with the tuning fork structure, enhanced sensitivity may be obtained if the carrier and response mode frequencies are accurately balanced. Choosing a material with radially isotropic properties is of great benefit in achieving this balance. Additional post manufacture fine tuning may still be required to achieve the desired accuracy, however.

In both the commercial and military fields there are numerous applications for inertial sensing units which require two or three axes of rate sensing. This may conventionally be achieved by mounting two or three single axis gyros in the required configuration. A sensor with inherent multi-axis rate sensing capability would be of great benefit for this and such a device would offer a reduction in size, complexity, component count and assembly time with consequent cost reduction.

Devices capable of two axis rate sensing are known. The Vibrating Wheel Gyro (VWOG) design developed at Draper Laboratory, Cambridge, Mass., USA is an example of such a device. This design consists of a ring structure centrally supported by four compliant beams. The resonant carrier mode is a pendulous rotary motion of the ring. Rotations around the x or y axes in the plane of the ring will set the ring into a rocking motion about the input rotation axis. This motion is detected capacitively by plates located under the ring. Such a known device is only capable of operating for two axes rate sensing.

OBJECTS OF THE INVENTION

Thus one object of the present invention is to provide an improved rate sensor for sensing applied rate on at least two axes. Preferably such a sensor should offer a multi axis rate sensing capability.

Another object of the present invention is to provide an improved rate sensor for sensing applied rate on at least two axes which is in the form of a single vibrating structure.

These and other objects and advantages of the present invention will become more apparent from details disclosed in the following specification where preferred embodiments of the invention are described.

SUMMARY OF THE INVENTION

According to the present invention there is provided a rate sensor for sensing applied rate on at least two axes, including a vibrating structure, means for vibrating the structure in a Cos 2θ carrier mode at a Cos 2θ mode frequency such that rotation about one or other of said at least two axes in the plane of the vibrating structure will generate a Coriolis force sufficient to cause a rocking motion of the vibrating structure about the same axis at a carrier mode frequency, with the vibrating structure having a substantially planar substantially ring or hoop-like form shaped and dimensioned to match the frequencies of the Cos 2θ mode and rocking mode vibrations in the vibrating structure to give a resonant amplification of the rocking motion, which rocking mode vibration is proportional to the applied rate, and means for detecting the rocking mode vibration and thereby the applied rate.

Preferably the vibrating structure is made of metal or of silicon.

Conveniently the vibrating structure is ring like in form having an outer rim supported by a plurality of legs extending substantially radially from a central boss.

Advantageously a sensor for sensing applied rate on two axes has a substantially planar ring-like vibrating structure made from metal, wherein the means for vibrating the vibrating structure in a Cos 2θ mode includes an electromagnetic carrier mode drive element and a capacitive carrier mode pick off element arranged at 0° and 270° respectively with respect to the outer rim of the vibrating structure and located in the plane of the outer rim radially externally thereof adjacent points of maximum radial motion of said rim when vibrating in the Cos 2θ mode, and wherein the means for detecting the rocking mode vibration includes an x axis electromagnetic drive element, an x axis capacitive pick off element, a y axis electromagnetic drive element and a y axis capacitive pick off element, located adjacent to the outer rim in superimposed relationship therewith at a perpendicular spacing therefrom, with the y axis pick off element, x axis drive element, y axis drive element and x axis pick off element being arranged at 0°, 90°, 180° and 270° respectively around the outer rim.

Preferably in a sensor for sensing applied rate on three axes, the means for vibrating the vibrating structure additionally includes an electromagnetic response mode drive element and a capacitive response mode pick off element located in the plane of the outer rim of the vibrating structure adjacent to the points of maximum radial movement for the outer rim when vibrating in a response mode, with the response mode drive element and pick off element being arranged at 135° and 225° respectively with respect to the outer rim of the vibrating structure and located in the plane of the outer rim radially externally thereof, to sense rotation about the axis normal to the plane of the vibrating structure.

Conveniently the outer rim is substantially circular in plan view or is substantially rectangular in plan view.

Advantageously the vibrating structure is made of a nickel-iron alloy.

Preferably a sensor for sensing applied rate on two axes has a substantially planar, substantially ring-like vibrating structure made from silicon wherein the means for vibrating structure in a Cos 2θ carrier mode includes two electromagnetic carrier mode drive elements and two capacitive carrier mode pick off elements arranged with the drive elements at 0° and 180° and the pick off elements at 90° and 270° respectively with respect to the outer rim of the vibrating structure and located radially externally of the outer rim adjacent points of maximum radial motion of the outer rim when vibrating in the Cos 2θ mode, and wherein the means for detecting the rocking mode vibration includes an x axis electromagnetic drive element, an x axis capacitive pick off element, a Y axis electromagnetic drive element and a Y axis capacitive pick off element located adjacent the outer rim in superimposed relationship therewith at a perpendicular spacing therefrom, with the y axis drive element, the x axis pick off element, the y axis pick off element and the x axis drive element being arranged at 0°, 90°, 180° and 270°, respectively around the outer rim.

Conveniently in a sensor for sensing applied rate on three axes the means for vibrating the vibrating structure additionally includes two electromagnetic z axis response mode drive elements and two capacitive z axis response mode pick off elements located in the plane of the outer rim of the vibrating structure radially externally thereof adjacent points of maximum radial movement for the outer rim when vibrating in a response mode, with the first z axis response mode drive element, the first z axis response mode pick off element, the second z axis response mode drive element and the second z axis response mode pick off element being arranged at 45°, 135°, 225° and 315° respectively around the outer rim of the vibrating structure.

Advantageously the outer rim is substantially circular in plan view with the outer rim and legs being suspended above an insulated substrate layer by means of the central boss which is mounted thereon.

Preferably the vibrating structure is dimensioned to match the frequencies of the Cos 2θ and rocking mode vibration by controlled removal of material from the edge of the outer rim to modify the mass thereof or by controlled removal of material from the neutral axis of the outer rim to modify the stiffness of the outer rim.

DESCRIPTION OF THE DRAWINGS

For a better understanding of the present invention, and to show how the same may be carried into effect, reference will now be made, by way of example, to the accompanying drawings, in which.

DESCRIPTION OF EMBODIMENTS OF THE INVENTION

A rate sensor according to the present invention is suitable for sensing applied rate on at least two axes. It includes a vibrating structure 6 and means for vibrating the structure 6 in a Cos 2θ carrier mode at a Cos 2θ frequency such that rotation about one or other of said at least two axes in the plane of the structure 6 will generate a Coriolis force sufficient to cause a rocking motion of the vibrating structure 6 about the same axis at the Cos 2θ carrier mode frequency. The vibrating structure 6 has a substantially planar substantially ring or hoop like form shaped and dimensioned to match the frequencies of the Cos 2θ mode and rocking mode vibrations in the vibrating structure to give a resonant amplification of the rocking motion caused by rotations around one or other of the two axes which rocking mode vibration is proportional to the applied rate. The sensor also includes means for detecting the rocking mode vibration and thereby the applied rate.

The vibrating structure 6 preferably is made of metal or of silicon and preferably is ring like in form having an outer rim 7 supported by a plurality of legs 8 extending substantially radially from a central boss 9.

Figure 7:
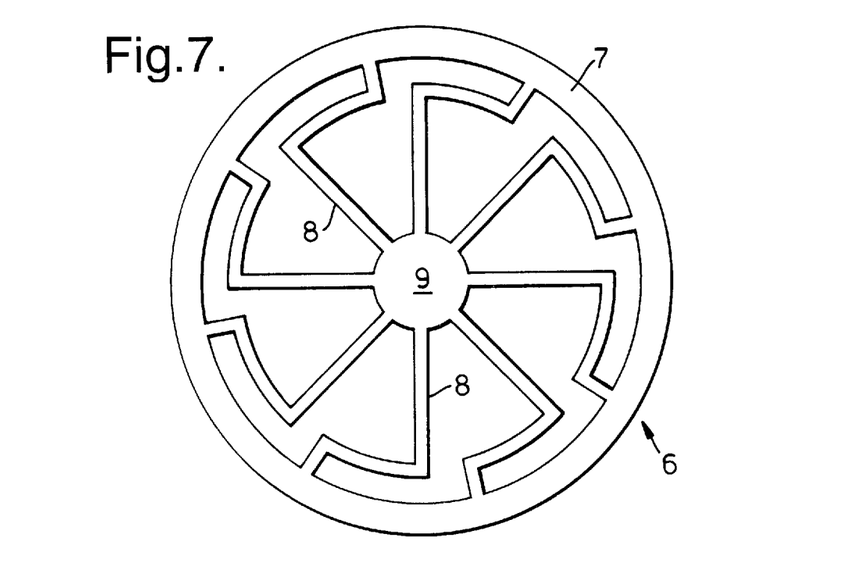
FIG. 7 is a diagrammatic plan view of a vibrating structure suitable for use in the sensor of the present invention.

The planar ring rim 7 is supported by a multiplicity of compliant legs 8 to allow substantially undamped vibration of the Cos 2θ mode of the ring rim. Conventionally maximum rate sensitivity around the axis normal to the plane of the ring is obtained with the two Cos 2θ mode frequencies accurately balanced. In practice, each leg 8 will apply a local perturbation to the mass and stiffness of the ring rim 7. In order to maintain the dynamic symmetry between the two modes, the resultant of all the individual perturbations to each mode must be balanced. This preferably is achieved using eight legs 8 placed symmetrically around the ring rim 7 as shown in FIG. 7 of the accompanying drawings.

Figure 3:
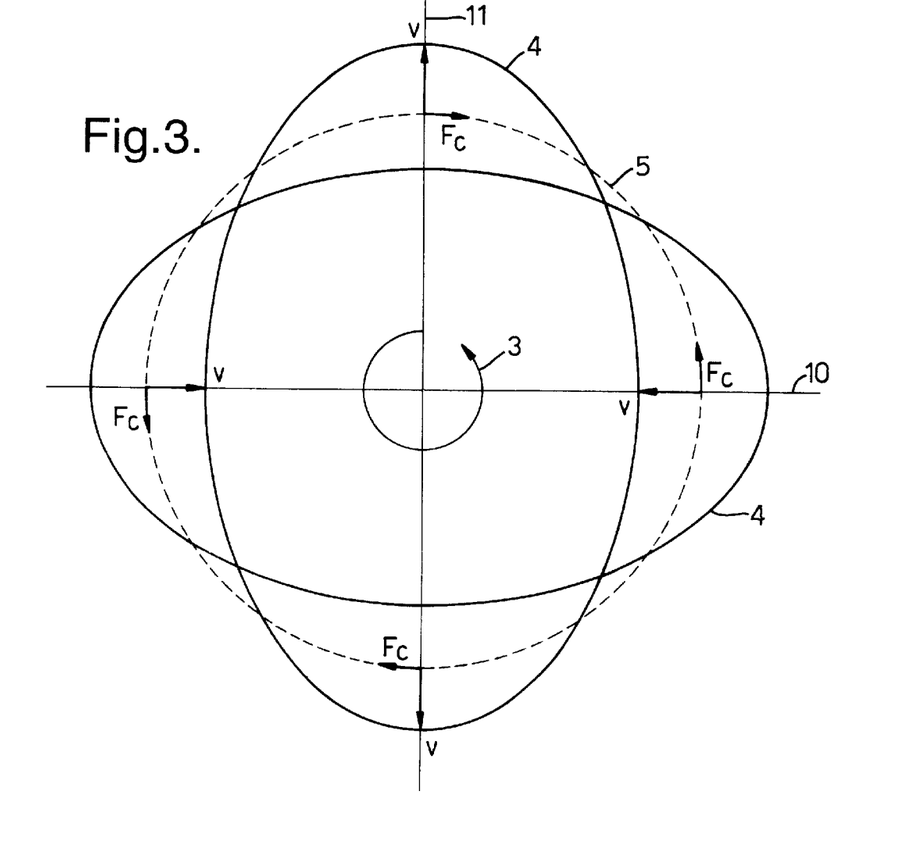
FIG. 3 shows diagrammatically Coriolis forces acting on a substantially ring-shaped vibrating structure at the antinodal points of a Cos 2θ carrier mode vibration when a rate is applied around the axis normal to the plane of the ring (z axis) in a conventional manner.
Figure 4:
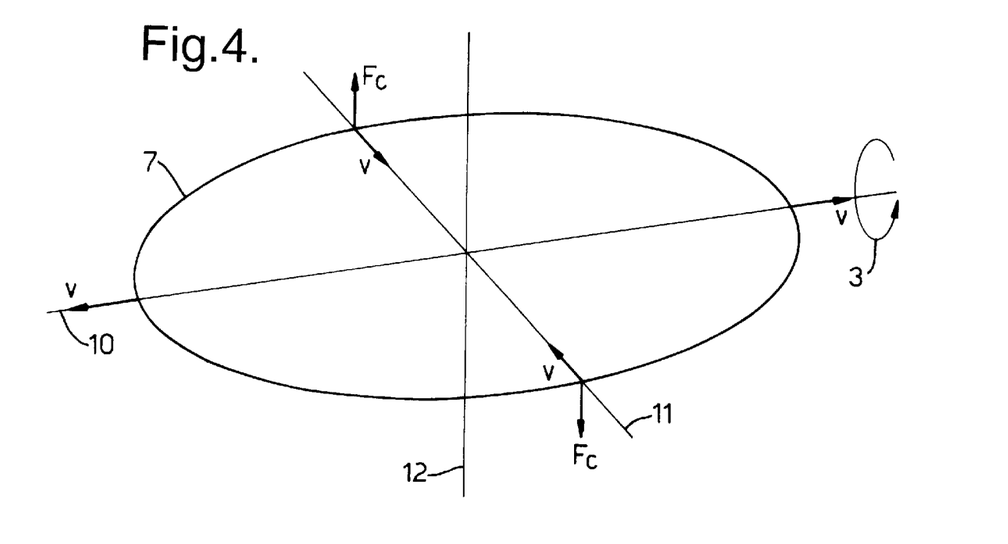
FIG. 4 shows diagrammatically the forces exerted on a substantially ring-shaped vibrating structure when a rate is applied around the x axis with the same Cos 2θ carrier mode.

The Cos 2θ motion of such a ring is shown in FIG. 2. The Coriolis forces resulting in the excitation of the response mode when a rate is applied around the z-axis 12 are shown in FIG. 3 in which the z axis 12 is out of the plane of the Figure. FIG. 4 shows the forces exerted at the Cos 2θ carrier mode anti-nodal points on the ring rim 7 when a rate is applied around the x-axis 10. The forces will set the ring rim 7 into a rocking motion around the x-axis 10.

Figure 5:
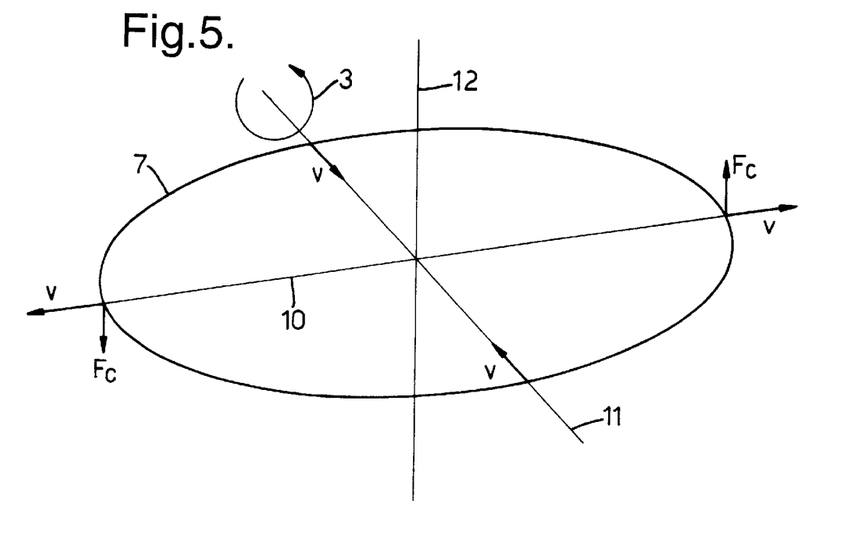
FIG. 5 is a diagrammatic illustration of an equivalent situation to that of FIG. 4 but for rotations around the Y axis.

The equivalent points along the y-axis 11 do not experience any Coriolis forces as the rotation vectors $F_c$ and velocity vectors V act along the same axis. FIG. 5 shows the equivalent situation for rotations around the y-axis 11. The ring rim 7 will rock around the y-axis 11 in this instance.

Figure 6A:
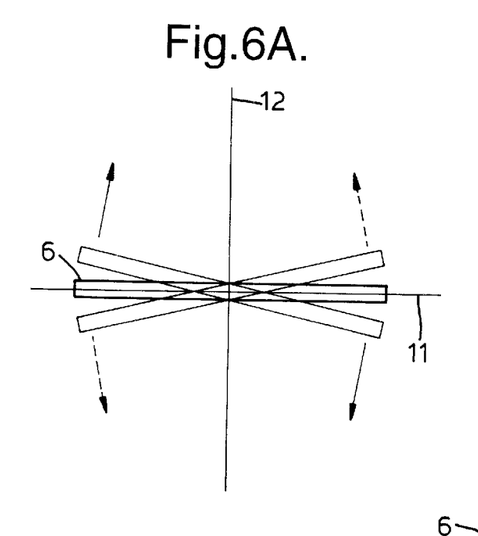
FIG. 6A shows a rocking mode according to the present invention of a vibrating structure from a rest position on the Y axis according to the present invention.
Figure 6B:
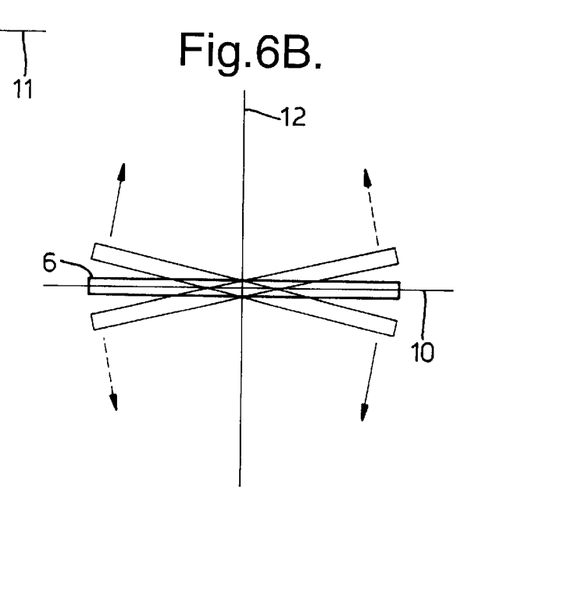
FIG. 6B is an equivalent view to that of FIG. 6A but showing rocking motion of the vibrating structure about a rest position in the x axis.

The sensitivity of the ring rim 7 to z-axis rotation is enhanced by matching the carrier and response mode frequencies. Finite element modelling of the vibrating structure enables the resonant frequencies of the various ring vibration modes to be calculated. As with the Cos 2θ modes, the rocking modes also exist as a degenerate pair at a mutual angle of 90°. A schematic of the ring rim motion for these modes is shown in FIGS. 6A and 6B. The two extreme points of deformation of the vibrating structure from its rest position 6 are shown together with the direction of motion during each half of the vibration cycle (solid and hatch arrows). The dimensions of the vibrating structure 6 according to the present invention and the shape are selected to set the frequency of the rocking modes to match that of the carrier mode. This results in amplification of the rocking mode motion by the Q factor of the structure thus increasing the sensitivity.

For a conventional single axis rate sensor vibrating structure design all the vibration takes place in the plane of the structure. For the tuning fork the carrier and response mode vibrations occur in two different planes. For the vibrating structure of the sensor of the present invention the structure is free to oscillate in any plane. The single Cos 2θ carrier mode is sufficient to provide all the linear momentum components necessary to couple energy into response modes in every geometric plane.

A two or three axis rate sensor according to the present invention requires additional drive and pick-off elements above and/or below the vibrating structure. While this does imply some increase in the size of the device the total volume will be considerably less than would be required for two or three appropriately oriented single axis units. An inertial measurement unit using a rate sensor of the present invention requires only a single carrier mode for all axes and thus a single drive circuit. The single axis gyro equivalent unit would require three separate drive circuits. These also operate at slightly different frequencies causing possible integration problems. The reduced electronic circuitry requirements will also result in reduced power consumption.

According to one aspect of the present invention the vibrating structure in FIG. 7 has a ring-like shape as previously described. As for a known conventional single axis design a suitable outer diameter of the vibrating structure rim 7 is 22 mm with a rim width of 1 mm and a thickness of 1.2 mm. The structure is made from a Nickel-Iron alloy and operates at a frequency of vibration of substantially 5 kHz. Preferably the structure is designed such that the Cos 2θ frequency is isolated from all other vibration modes. The legs 8 give a compliant support to the ring rim 7 while maintaining sufficient stiffness in the out of plane axis to make the device insensitive to vibrations at lower frequencies. The rocking mode resonant frequency is around 2 kHz for this structure.

For the purposes of the present invention the vibrating structure design is modified to match the Cos 2θ and rocking mode frequencies. To match these two mode frequencies the legs 8 need to be stiffer in comparison to the ring rim 7 and the thickness needs to be increased from the more usual 1.2 mm thickness of the known conventional single axis vibrating structure design. This potentially increases the mounting sensitivity of the sensor with a possible reduction of the mechanical Q. Suitable dimensions for the vibrating structure ring are 22 mm outer diameter, a rim width of 0.5 mm, and a thickness of around 2 mm. The resonant frequencies of interest occur at around 3.1 kHz for this vibrating structure design.

Mechanical tuning is required to achieve accurate balancing of the modes. This may be achieved by the controlled removal of material from the edge of the ring rim 7 or by mass removal at the neutral axis, affecting the stiffness or mass respectively. A similar procedure is required to balance the rocking and Cos 2θ modes. For the rocking mode, the ring rim 7 may be considered as simply a carried mass at the end of the legs 8. Removal of material from the edge of the ring rim 7 will thus reduce this carried mass giving an increase in the resonant frequency. For the Cos 2θ mode the stiffness is reduced leading to a reduction in the frequency. The two mode frequencies can thus be differentially shifted enabling them to be brought accurately into balance.

Figure 8:
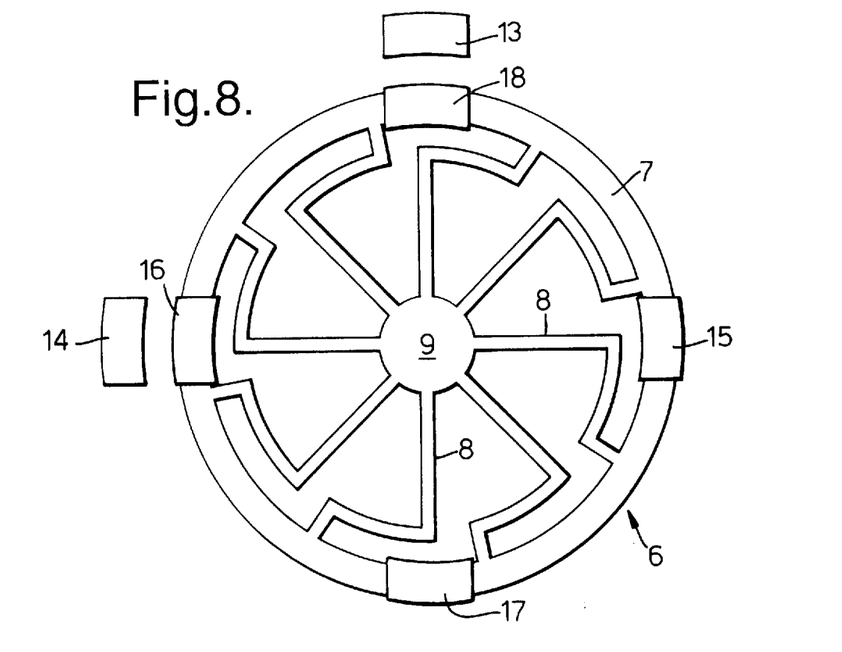
FIG. 8 is a diagrammatic view in plan of a two axis rate sensor according to one embodiment of the present invention.

A rate sensor according to a first embodiment of the present invention, utilising a vibrating structure 6 as shown in FIG. 7, for sensing applied rate on two axes is shown diagrammatically in FIG. 8. The substantially planar ring-like vibrating structure 8 is made from metal. The means for vibrating the structure may be electromagnetic, electrostatic or piezoelectric and the means for detecting movement may be capacitive, electromagnetic, piezoelectric, optical or strain gauge. Preferably electromagnetic drive elements and capacitive pick off elements are employed.

As shown in FIG. 8 of the accompanying drawings a rate sensor according to a first embodiment of the present invention for sensing applied rate on two axes has means for vibrating the structure 6 in a Cos 2θ mode which includes an electromagnetic carrier mode drive element 13 and a capacitive carrier mode pick off element 14 arranged at 0° and 270° respectively with respect to the other rim 7 of the structure 6 and located in the plane of the outer rim 7 radially externally thereto adjacent points of maximum radial motion of the rim 7 when vibrating in the Cos 2θ mode. The means for detecting the rocking mode vibration includes an x axis electromagnetic drive element 15, an x axis capacitive pick off element 16, a y axis electromagnetic drive element 17 and a y axis capacitive pick-off element 18 located adjacent to the outer rim 7 in superimposed relationship therewith at a perpendicular spacing therefrom out of plane with respect to the outer rim 7. The y axis pick-off element 18, x axis drive element 15, y axis drive element 17 and x axis pick-off element 16 are arranged at 0°, 90°, 180° and 270° respectively around the outer rim 7.

Figure 10A:
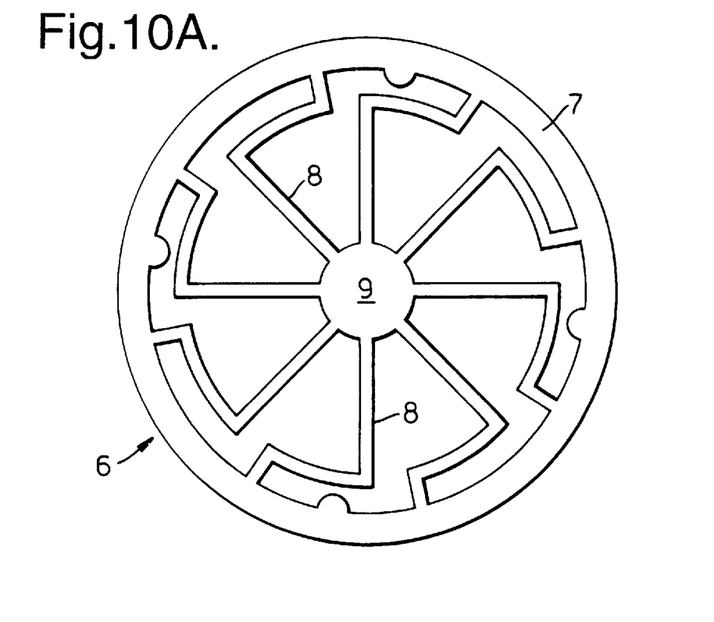
FIGS. 10A, 10B and 10C show alternate constructions of vibrating structure for use with two axis sensors according to the present invention.
Figure 10B:
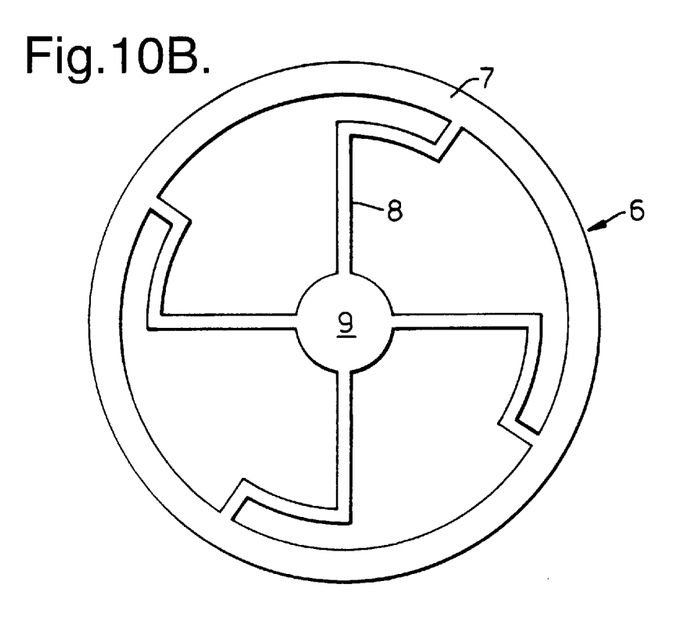
Figure 10C:
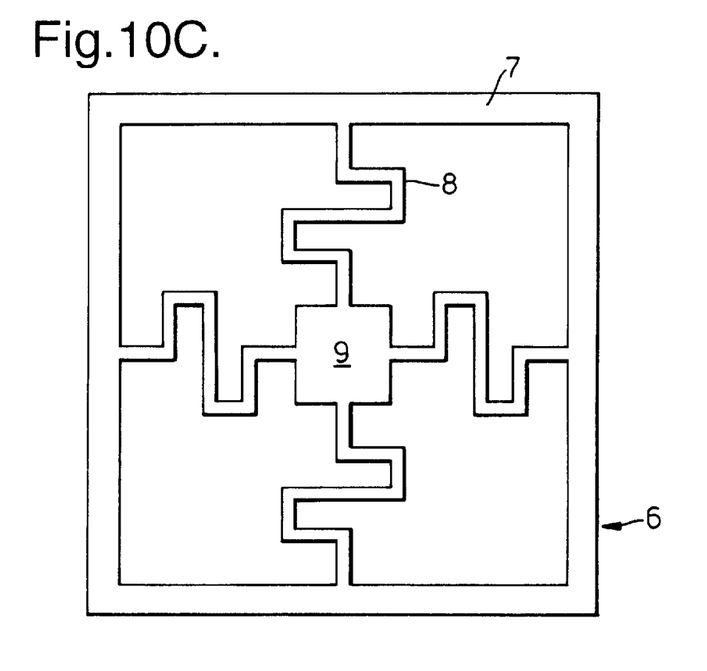

For the two axis implementation the same carrier mode is employed but with a deliberate mismatch between the two cos 2θ mode frequencies. This mismatch can be built in during the manufacture process by perturbing the mass or stiffness at four equidistant points on the ring rim 7 as shown in FIG. 10A. Alternatively, a vibration structure design utilising only four support legs 8 as shown in FIG. 10B will also split the two cos 2θ mode frequencies. The use of a non-radially symmetric shape, such as a planar square as shown in FIG. 10C capable of sustaining the same basic mode of oscillation is also satisfactory. These alternative two axis vibrating structures have the advantage that the carrier mode position is accurately fixed at a known position by the vibrating ring geometry. These shapes, while dynamically asymmetric for the two cos 2θ modes, are still symmetric as far as the rocking mode pair is concerned. This configuration will provide rate sensitivity around the x and y axes in the plane of the vibrating structure. There will be no z-axis sensitivity.

Although a single drive and pick-off module per axis is shown in the embodiment of FIG. 8, additional drive and pick-off elements may be employed if desired giving increased amplitude in motion and sensitivity. This applies also to the embodiment of FIG. 9.

Figure 9:
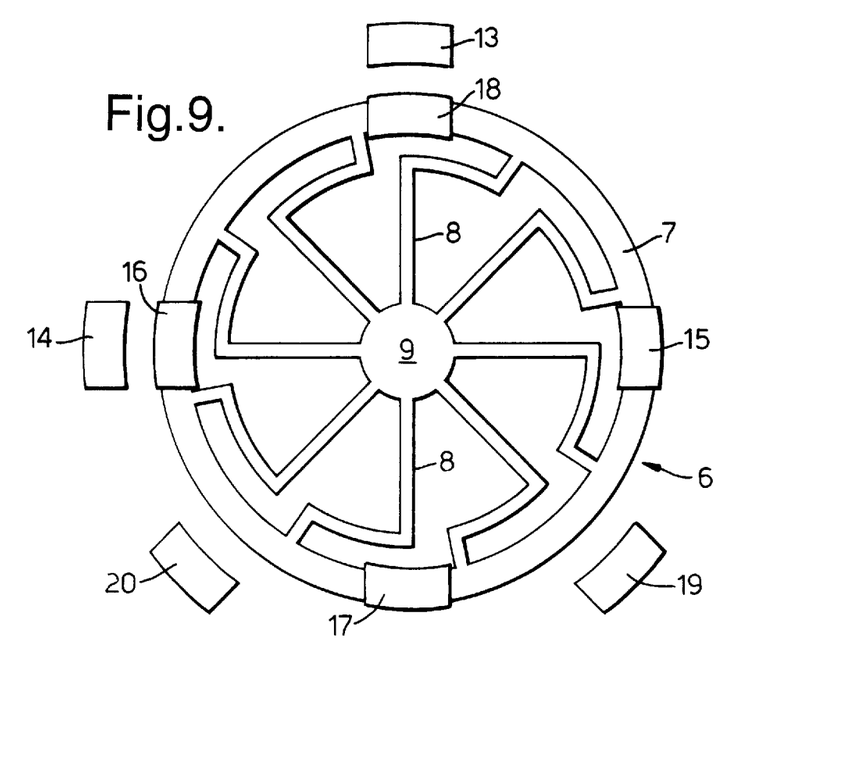
FIG. 9 is a diagrammatic plan view of a three axis rate sensor according to a second embodiment of the present invention.

The embodiment of the invention illustrated in FIG. 9 is a rate sensor for sensing applied rate on three axes. For this embodiment the Cos 2θ carrier and response mode frequencies must be matched and thus only a vibrating structure such as shown in FIG. 7 is suitable. The sensor is basically the same as the embodiment of FIG. 8 and like parts have been given like reference numbers and will not be further described in detail. However in this embodiment the means for vibrating the vibrating structure 6 additionally includes an electromagnetic response mode drive element 19 and a capacitive response mode pick-off element 20 located in the plane of the outer rim 7 of the vibrating structure 6 adjacent the points of maximum radial movement for the outer rim 7 when vibrating in a response mode. The response mode drive element 19 and pick off element 20 are arranged at 135° and 225° respectively with respect to the outer rim 7 of the vibrating structure 6 and are located in the plane of the outer rim radially externally thereof to sense rotation about the axis normal to the plane of the vibrating structure. Rotation about this latter axis will generate Coriolis forces which cause vibration of the Cos 2θ response mode in the plane of the rim 7. The amplitude of this vibrator will be proportional to the applied rate.

The sensor of FIG. 9 may be operated in a forced feedback configuration in which the motion detected at the response mode pick-off element 20 is nulled using the response mode drive element 19. Rotation of the sensor about the x axis will induce an oscillation at the x axis pick-off element 16. This motion is nulled using the x axis drive element 15. The y axis pick-off element 18 and drive element 17 operate identically. This mode of operation prevents any out of plane motion of the ring rim 7 which might generate noise on the in plane pick-off elements. The drive elements 15 and 17 also serve to excite the rocking modes for balancing purposes.

The sensor of the embodiments of FIGS. 8 and 9 incorporates a metal vibrating structure 6. However the sensor may also be manufactured from any material which possesses suitable properties and is capable of being set into resonance and the resulting motion detected as previously set forth. An alternative is to manufacture the vibrating structure by micromachining techniques from materials such as crystalline silicon, poly silicon, quartz or metal.

Figure 11:
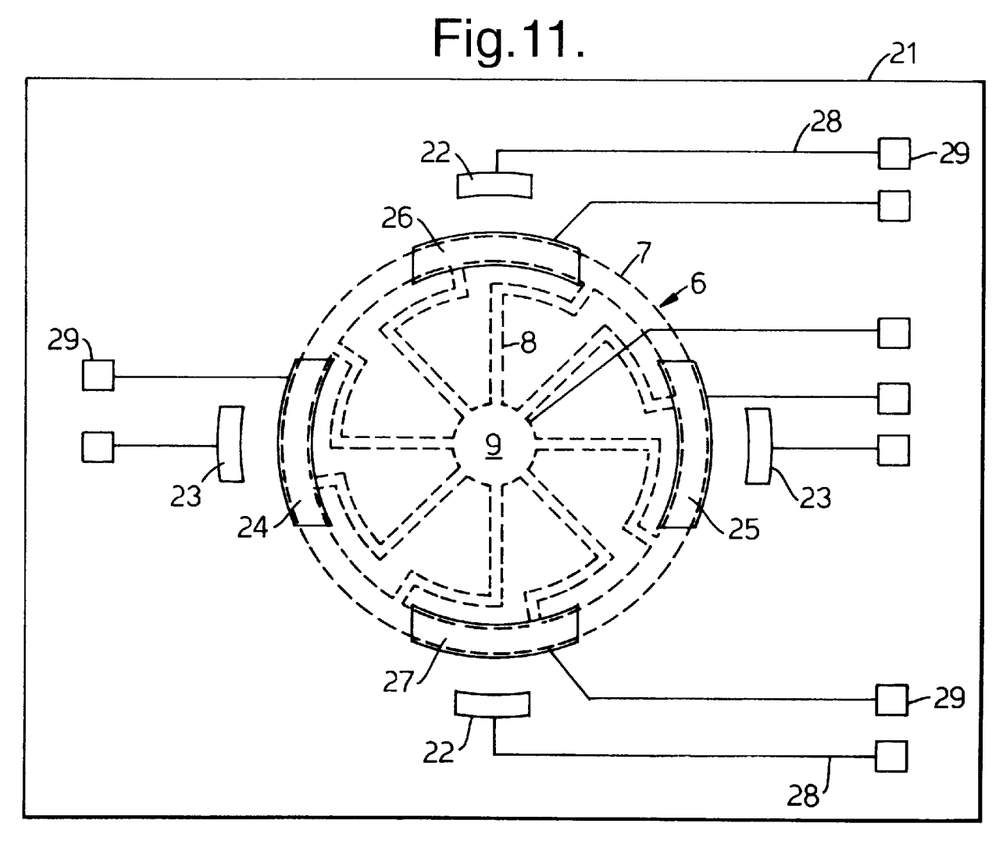
FIG. 11 shows in plan view a two axes rate sensor according to a third embodiment of the present invention.

FIG. 11 of the accompanying drawings shows diagrammatically a sensor according to a third embodiment of the present invention using a silicon vibrating structure 6 as previously described in connection with the embodiments of FIGS. 8 and 9, drive elements may be electromagnetic, electrostatic, piezo, thermal or optical in actuation and the vibrating structure 6 motion may be detected using electrostatic, electromagnetic, piezo or optical techniques. FIG. 11 shows a two axes rate sensor in silicon using electrostatic drive elements and electrostatic pick-offs. The vibrating structure 6 has a substantially planar substantially ring-like shape conveniently having an outer rim 7, legs 8 and a central boss 8 as previously described. The structure 6 is located via the boss 9 on an insulating substrate layer 21 which may be made of glass or silicon with an insulating oxide surface layer. The vibrating structure 6 is maintained at a fixed voltage with respect to all the conductors which act as the drive and pick-off elements.

In the FIG. 11 embodiment the means for vibrating the vibrating structure 6 in a Cos 2θ carrier mode includes two electrostatic carrier drive elements 22 and two electrostatic carrier mode pick-off elements 23 arranged with the drive elements 22 at 0° and 180° and the pick-off elements 23 at 90° and 270° respectively with respect to the outer rim 7 of the vibrating structure and located radially externally of the outer rim adjacent the points of maximum radial motion of the rim 7 when vibrating in the Cos 2θ mode. These carrier mode drive elements 22 are used to set the vibrating structure 6 into oscillation. The carrier mode pick-off elements 23 which are located at the carrier mode anti-nodal points, sense the radial motion of the vibrating structure 6.

In the FIG. 11 embodiment the means for detecting the rocking mode vibration includes an x axis electrostatic drive element 24, an x axis electrostatic pick-off element 25, a y axis electrostatic drive element 26 and a y axis electrostatic pick-off element 27 located adjacent the outer rim in superimposed relationship therewith at a perpendicular spacing therefrom with the y axis drive element 26, the x axis pick-off element 25, the y axis pick-off element 27 and the x axis drive element 24 being arranged at 0°, 90°, 180° and 270° respectively around the outer rim 7.

Figure 13:
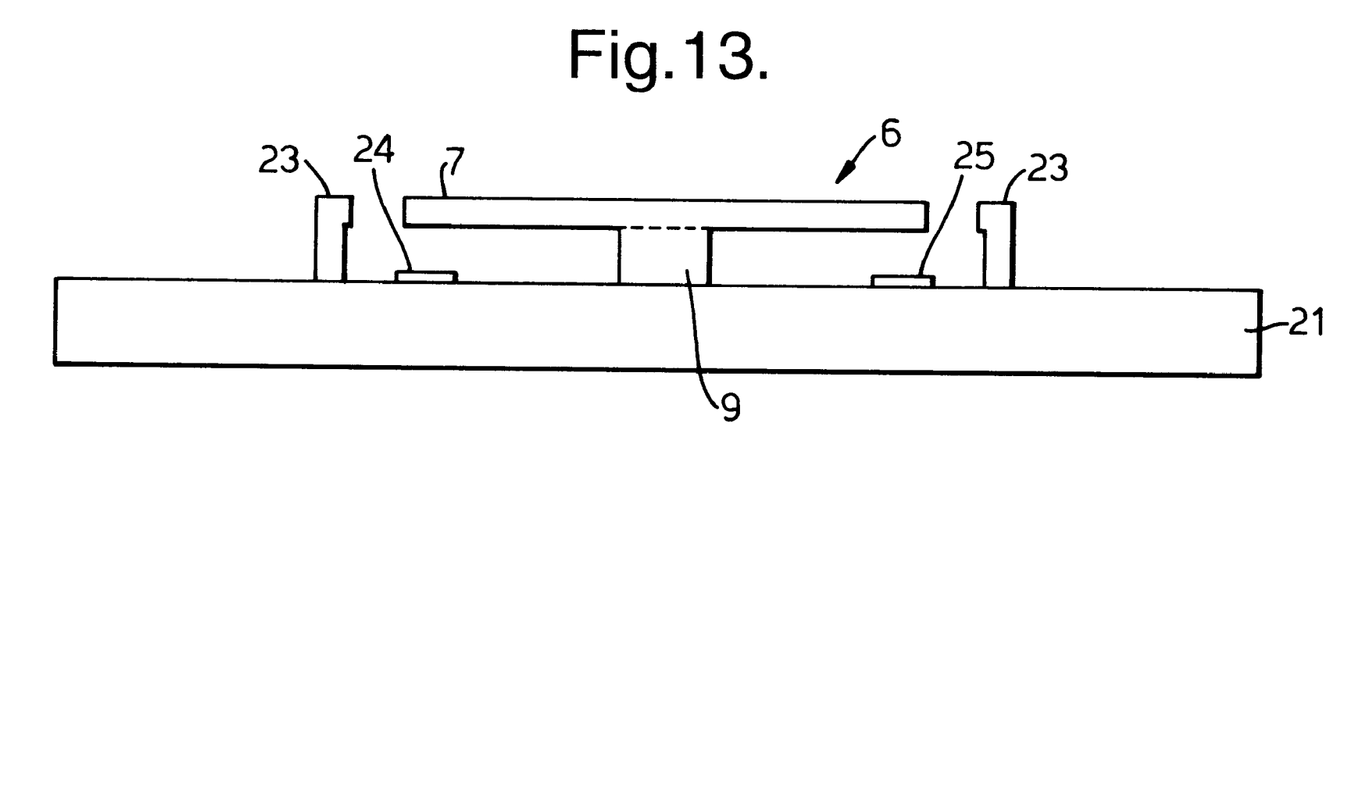

The rocking motion of the x axis rate response mode is detected at the pick-off element 25 located on the surface of the support substrate under the rim 7. This motion is nulled using the x axis drive element 24 similarly located under the opposite side of the rim 7. The y axis rate response motion is similarly detected by pick-off element 27 and nulled by drive element 26. The various drive and pick-off conductive sites are connected, via tracking 28 laid onto the substrate layer surface 21, to bond pads 29. The drive and pick-off circuitry is then connected to these bond pads. A cross section of the sensor of FIG. 11 is shown in FIG. 13. This shows the topography of the in plane and surface conductors more clearly.

Figure 12:
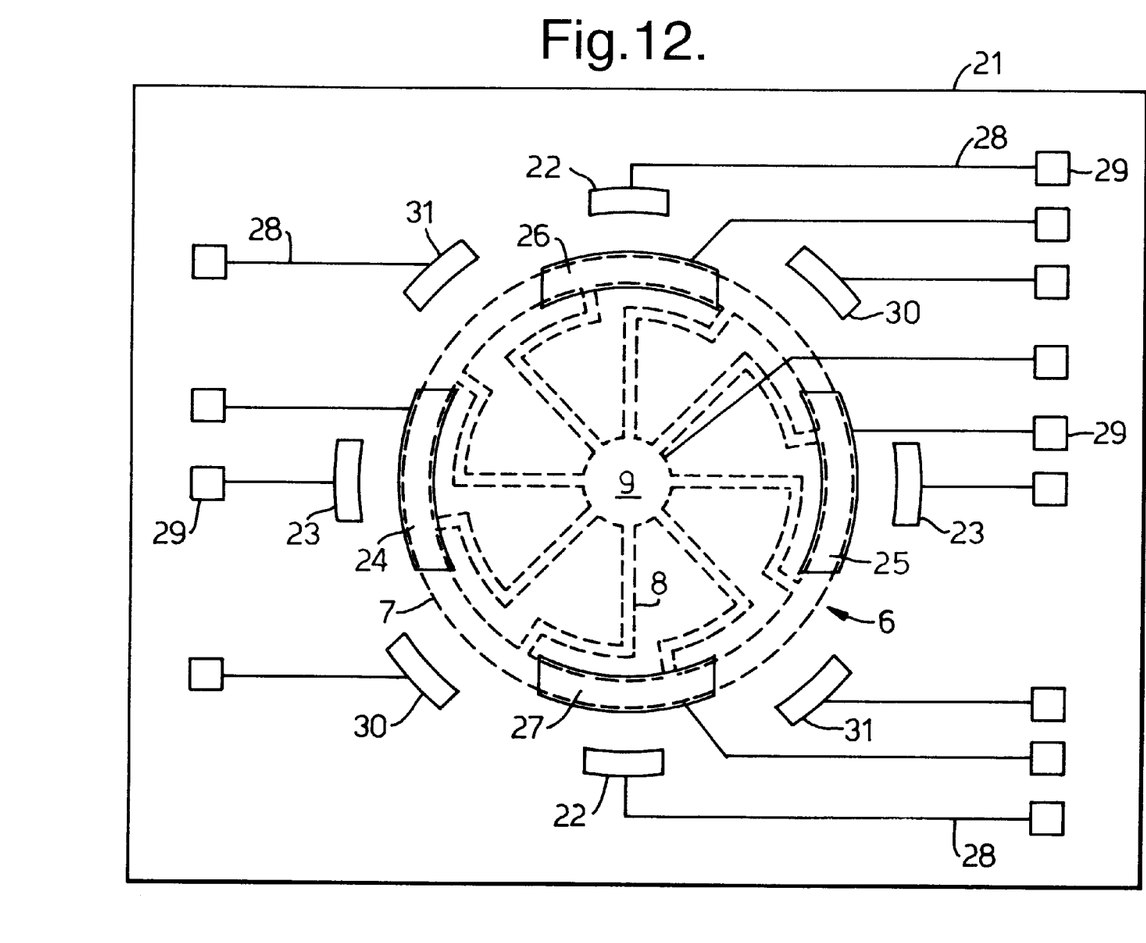
FIG. 12 shows in plan view a three axes rate sensor accordingly to a fourth embodiment of the present invention and FIG. 13 is an edge view of a detail of the embodiment of FIG. 12.

FIG. 12 of the accompanying drawings shows in plan a sensor according to a fourth embodiment of the present invention for sensing applied rate on three axes. This rate sensor is basically the same as that of FIG. 11 and like parts have been given like reference numerals and will not be further described in detail. In the embodiment of FIG. 12 the means for vibrating the vibrating structure 6 additionally includes two electrostatic z axis response mode drive elements 30 and two electrostatic z axis response mode pick-off elements 31 located in the plane of the outer rim 7 of the vibrating structure 6 radially externally thereof adjacent points of maximum radial movement for the outer rim 7 when vibrating in a response mode. The first z axis response mode drive element 30, the first z axis response mode pick-off element 31, the second z axis response mode drive element 30 and the second z axis response mode pick-off element 31 are arranged at 45°, 135°, 225° and 315° respectively around the outer rim 7 of the vibrating structure 6. The z axis rate response mode motion is detected by the pick-off elements 31.

Material removal from the vibrating structure 6 to adjust the mass and stiffness in the FIGS. 11 and 12 embodiments may be carried out using laser ablation techniques. Additionally although the two axis rate sensor of FIG. 11 has been shown with an eight leg vibrating structure it may alternatively use vibrating structures having a shape and form corresponding to those of FIGS. 10A, 10B and 10C.

Various modifications and alterations may be made to the embodiments of the present invention described and illustrated, within the scope of the present invention as defined in the following claims.

What is claimed is:

1. A rate sensor for sensing applied rate on at least two axes, including a vibrating structure, means for vibrating the structure in a Cos 2θ carrier mode at a Cos 2θ carrier mode frequency such that rotation about one or other of said at least two axes in the plane of the vibrating structure will generate a Coriolis force sufficient to cause a rocking motion and rocking mode vibration of the vibrating structure about the same axis out of the plane of the vibrating structure at the Cos 2θ carrier mode frequency, with the vibrating structure having a substantially planar substantially ring or hoop-like form shaped and dimensioned to match the frequencies of the Cos 2θ carrier mode and the rocking mode vibration in the vibrating structure to give a resonant amplification of the rocking motion, which rocking mode vibration is proportional to the applied rate, and means for detecting the rocking mode vibration and thereby the applied rate.

2. A sensor according to claim 1, wherein the vibrating structure is made of metal or of silicon.

3. A sensor according to claim 2, wherein the vibrating structure is ring like in form having an outer rim supported by a plurality of legs extending substantially radially from a central boss.

4. A sensor according to claim 3, for sensing applied rate on two axes, having a substantially planar ring-like vibrating structure made from metal, wherein the means for vibrating the vibrating structure in a Cos 2θ carrier mode includes an electromagnetic carrier mode drive element and a capacitive carrier mode pick off element arranged at 0° and 270° respectively with respect to the outer rim of the vibrating structure and located in the plane of the outer rim radially externally thereof adjacent points of maximum radial motion of said rim when vibrating in the Cos 2θ carrier mode, and wherein the means for detecting the rocking mode vibration includes an x axis electromagnetic drive element, an x axis capacitive pick off element, a y axis electromagnetic drive element and a y axis capacitive pick off element, located adjacent to the outer rim in superimposed relationship therewith at a perpendicular spacing therefrom, with the y axis pick off element, x axis drive element, y axis drive element and x axis pick off element being arranged at 0°, 90°, 180° and 270° respectively around the outer rim.

5. A sensor according to claim 4, for sensing applied rate on three axes, wherein the means for vibrating the vibrating structure additionally includes an electromagnetic response mode drive element and a capacitive response mode pick off element located in the plane of the outer rim of the vibrating structure adjacent to the points of maximum radial movement for the outer rim when vibrating in a response mode, with the response mode drive element and the pick off element being arranged at 135° and 225° respectively with respect to the outer rim of the vibrating structure and located in the plane of the outer rim radially externally thereof, to sense rotation about an axis normal to the plane of the vibrating structure.

6. A sensor to claim 3, wherein the outer rim is substantially circular in plan view or is substantially rectangular in plan view.

7. A sensor according to claim 5, wherein the vibrating structure is made of a nickel-iron alloy.

8. A sensor according to claim 3, for sensing applied rate on two axes, having a substantially planar, substantially ring-like vibrating structure made from silicon, wherein the means for vibrating the vibrating structure in a Cos 2θ carrier mode includes two electrostatic carrier mode drive elements and two electrostatic carrier mode pick off elements arranged with the drive elements at 0° and 180° and the pick off elements at 90° and 270° respectively with respect to the outer rim of the vibrating structure and located radially externally of the outer rim adjacent points of maximum radial motion of the outer rim when vibrating in the Cos 2θ carrier mode, and wherein the means for detecting the rocking mode vibration includes an x axis electrostatic drive element, an x axis electrostatic pick off element, a y axis electrostatic drive element and a y axis electrostatic pick off element located adjacent the outer rim in superimposed relationship therewith at a perpendicular spacing therefrom, with the y axis drive element, the x axis pick off element, the y axis pick off element and the x axis drive element being arranged at 0°, 90°, 180° and 270°, respectively around the outer rim.

9. A sensor according to claim 8, for sensing applied rate on three axes, wherein the means for vibrating the vibrating structure additionally includes two electrostatic z axis response mode drive elements and two electrostatic z axis response mode pick off elements located in the plane of the outer rim of the vibrating structure radially externally thereof adjacent points of maximum radial movement for the outer rim when vibrating in a response mode, with the first z axis response mode drive element, the first z axis response mode pick off element, the second z axis response mode drive element and the second z axis response mode pick off element being arranged at 45°, 135°, 225° and 315° respectively around the outer rim of the vibrating structure.

10. A sensor according to claim 9, wherein the outer rim is substantially circular in plan view with the outer rim and the legs being suspended above an insulated substrate layer by means of the central boss which is mounted thereon.

11. A sensor according to claim 3, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

12. A sensor according to claim 4, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

13. A sensor according to claim 5, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

14. A sensor according to claim 6, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

15. A sensor according to claim 7, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

16. A sensor according to claim 8, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

17. A sensor according to claim 9, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

18. A sensor according to claim 10, wherein the vibrating structure is dimensioned to match the frequencies of the Cos 2θ carrier mode and the rocking mode vibration by controlled removal of material from the edge of the outer rim to modify the mass thereof or by controlled removal of material from a neutral axis of the outer rim to modify the stiffness of the outer rim.

\* \* \* \* \*